3,231,221
VERTICAL TAKE-OFF AIRPLANES
Haviland H. Platt, 570 Park Ave., New York, N.Y.
Filed Mar. 10, 1964, Ser. No. 350,809
18 Claims. (Cl. 244—12)

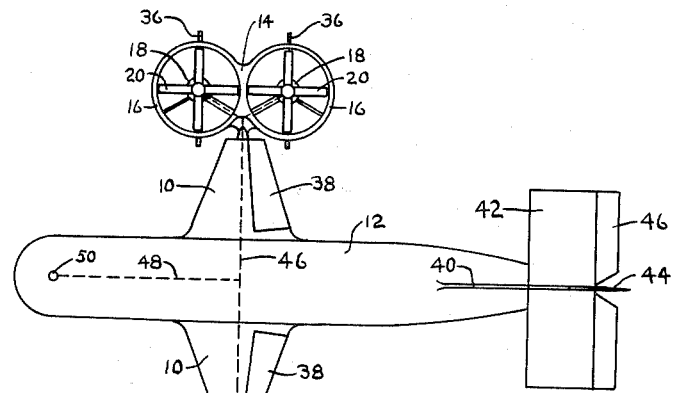
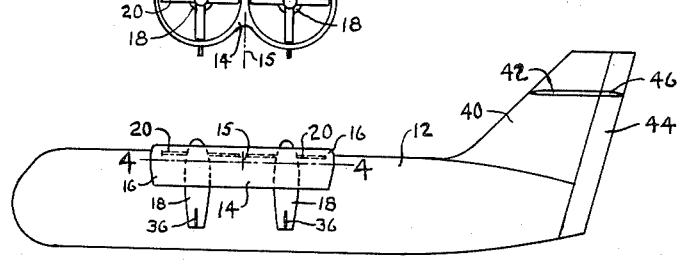
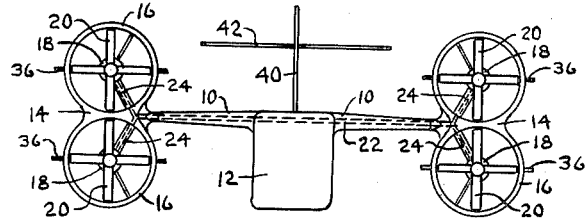
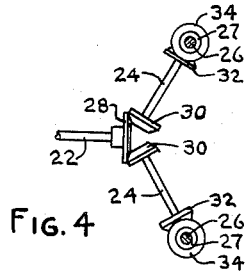

The present invention relates to vertical take-off airplanes in which engine-propeller combinations with enough power to lift the aircraft vertically are provided and in which provision is made for directing the thrust vertically for take-off and landing and for rotating the propellers into a position with their thrusts generally horizontal for forward flight.

Designs within the confines of the above described category are the subjects of my United States Patents Nos. 3,039,719 and 3,059,876 both of which are chiefly concerned with solutions of the problems associated with the tilting of the propellers, whether they are fixed to and tilted with the wings or whether they are tilted independently of fixed wings.

The considerations which form the subject of this invention, by contrast, have to do generally with the type and arrangement of propellers and associated power sources for optimum performance.

It is nowadays uncontested that the optimum type of engine for vertical take-off aircraft is the gas turbine, on account of light weight, simplicity and reliability. However, in applications of the turbine engine a wide variety of arrangements and auxiliary components have been proposed. The simple propellerless turbine known as the turbo-jet, tiltable between positions of vertical and horizontal thrust, has been given much consideration and experimental attention. A serious, or even prohibitive, difficulty with this uncomplicated approach is the turbojet characteristic of providing substantially constant thrust regardless of its motion through the air. Thus when lifting off the ground from a stationary start the thrust is no greater than that avialable for high-speed forward flight. However, particularly for subsonic commercially useful aircraft, the vertical thrust requirement is much greater—four to five times, for example—than the forward flight requirement. Other serious drawbacks are excessive noise and high velocity jet exhausts which make them undesirable for operation in populous areas and on other than prepared landing sites. On the other hand, the powerplant arrangement in which thust is developed by a propeller driven by a turbine is capable of the required thrust augmentation for vertical flight by control of the pitch of the propeller.

In considering aircraft powered by turbine-propeller units, customarily designated turbo-props, the question arises as to whether it is preferable to tilt the wing with the propellers or whether the wing should remain fixed to the fuselage and the propellers only tilt relative to the wing and fuselage. Because of serious interference between fixed wings and propeller slipstreams attention has mainly been concentrated on the tilt-wing type. However, it has been ascertained that this arrangement leads to aerodynamic difficulties, particularly related to flow separation and wing-stall in low speed forward descent regimes. A means of overcoming, or minimizing, the problem of tiltable versus fixed wing has been proposed hitherto. This is the use of the shrouded propeller. It is theoretically known and has been demonstrated in practice that a propeller mounted within a properly designed cylindrical shroud provides substantially the same thrust performance as does an unshrouded propeller having twice the swept disc area. This makes it feasible to mount tiltable shrouded propellers at the wing tips where they do not interfere with the wing, and research airplanes employing this principle have been successfully demonstrated. A design of this kind is illustrated in my United States Patent No. 3,039,719. The shroud adds appreciably to the weight and air drag, but this is largely offset by the possibility of designing the shroud to act as an efficient wing extension in forward flight. The fixed wing can therefore be reduced in area and span.

The aircraft with a single shrouded propeller at each wing tip has, however, been found to be deficient in that control of tilt of the shrouded propeller is inadequate without the addition of complicating auxiliary means for providing supplementary pitching moments.

My invention offers a solution for the above enumerated problems. Thus it is proposed to utilize a fixed wing of small area having tiltably mounted at each tip a structure comprising two propellers, one above the other in forward flight attitude, with a composite shroud surrounding them. Preferably the turbine engines are mounted adjacent the propellers and tilt with them, although optionally the engines may be located elsewhere with shafting connecting them to the propellers. In either case shafting is provided to connect all four propellers, with overrunning clutches arranged so that the propellers will continue to turn in unison in case of failure of one or more engines.

The following advantages flow from the arrangement of my invention:

(1) The spacing of the thrust forces on opposite sides of the tilt axis makes available large tilt moments by differential control of the pitches of each pair of turboprop units, in accordance with the principle of my United States Patent No. 3,059,876.

(2) Interference between propellers and between wings and propellers is entirely avoided.

(3) The overall wing span is less than would be required by any other arrangement of equal performance.

(4) The reduction of propeller diameter resulting from the shrouded construction affords ample ground clearance.

(5) The shrouds ensure safety of personnel and passengers from the hazard of rotating propellers.

(6) With the engines in the shrouds the engine torque reactions do not affect longitudinal trim of the aircraft.

(7) Using the type of fuselage-propeller tilt interconnection principle set forth in my United States Patent No. 3,039,719 the trim attitude of the fuselage may be readily adjusted during both vertical and transitional flight.

(8) The weight is low due to compactness and minimization of shafting and mechanical installations.

(9) High forward speed potentiality is assured by the aerodynamic cleanness.

(10) Multi-engine safety is provided.

(11) The fixed wing is free from stall in low speed descent, as also largely are the propeller shrouds on account of the propeller induced axial flow component through them.

(12) The slipstream and turbine exhaust velocities are low enough to avoid serious noise and ground erosion.

(13) The wings are available for fuel storage, as in conventional airplanes.

(14) Aircraft of my novel construction are particularly well adapted for mass transportation between centers of population moderate distances apart which are not adequately served by conventional air transport because of the remoteness of airports from city centers.

With these and other advantages in view, as will appear more fully from the following detailed description, one embodiment of the present invention is described hereinafter and illustrated diagrammatically in the accompanying drawings, in which like reference characters indicate like parts, and in which:

FIGURE 1 is a diagrammatic plan view of an airplane representing one embodiment of the invention, having its propellers in position for vertical flight, FIGURE 2 is a side elevation of the airplane illustrated in FIGURE 1 with its propellers also in position for vertical flight, FIGURE 3 is a front elevation of the airplane shown in FIGURE 1 and 2 with the propellers in position for forward flight, and FIGURE 4 is a diagrammatic, fragmentary cross sectional view to an enlarged scale generally on line 4—4 of FIGURE 2 showing particularly the arrangement of shafts and gears interconnecting the propellers.

The airplane shown is a four-engined airplane with short-span fixed wings 10 integral with the fuselage 12. At the tip of each wing is pivotally mounted the shroud structure 14 which is free to rotate about a transverse axis 15 between the attitude shown in FIGURE 1 and that of FIGURE 3, the angle of tiltability relative to fuselage 12 being preferably slightly more than 90°. Means for applying and controlling a restraining torque between fuselage 12 and the shroud structure 14 may be provided as taught by my United States Patent No. 3,039,719.

Each shroud structure 14 comprises two parallel cylindrical shrouds 16, coaxially central in each of which is mounted a suitably faired turbine engine 18 driving a propeller 20 which may be provided with controllable pitch in the customary manner. The four propellers 20 are interconnected by gearing and shafting comprising the transverse shaft 22 contained within the contours of wings 10 (shown only in FIGURES 3 and 4), the four shorter shafts 24 which extend from the ends of shaft 22 to each of the four propeller shafts 26 thus forming outwardly divergent V-configurations, and suitable gear connections, such as the bevel gears 28, 30, 32 and 34. The shafts 24 may be contained within faired struts forming part of the structural support of the engines 18. Overrunning clutches, indicated at 27 in FIGURE 4, are suitably installed, in the conventional manner, in the drive connections of engines 18 so as to enable the propellers and interconnecting to continue to roate in unison with one or more engines dead. The diveregnt or V- arrangement of the shafts provides a particularly compact, light, low drag construction which, together with the small diameter shrouded propellers, admits the placing of the propellers with the minimum overall transverse dimension, thus forming an outstandingly compact vertical take-off aircraft.

Control surfaces 36 may be pivotally attached at the rear of engines 18, mainly within the slipstreams of propellers 20, to provide yaw control in vertical flight and roll control in forward flight. Conventional flaps 38 may be included at the trailing edges of wings 10 for lift augmentation at low forward speeds. The empennage may be of conventional design with the vertical fin 40 and horizontal fin 42 for stability in forward flight. Rudder 44 and elevator 46 may also be provided for pitch and yaw control in forward flight.

The surfaces 36, which correspond to conventional ailerons, are optional since yaw control in vertical flight and roll control in forward flight may be attained by differenial tilt of the two shroud structures 14. In either case provision is made for altering appropriately the control connection between the pilot's station and the control surfaces or propeller tilt mechanism, as taught in my United States Patent No. 2,702,168. Optionally also one of the control surfaces 36 on each side may be omitted if these surfaces are used for control. However, the use of surfaces 36 is preferred because their use involves less inertial resistance and less mechanical complexity than differential propeller tilting, and also because they may be adapted powerfully to augment the tilting moment provided by rotation of shrouds 14, thus reducing the amount of pitch change required of propellers 20.

The pitches of the four variable-pitch propellers 20 are under control of the pilot, both differentially and collectively. The control means for effecting these control actions are indicated diagrammatically by the dotted lines 46 and 48 extending between the engines 18 and the pilot's station 50. Devices for the purpose are well known in the art in many forms, with mechanical, hydraulic pneumatic and electrical actuations.

In operation, with vertical take-off, the propellers are placed in the attitude shown in FIGURES 1 and 2. When power is applied the aircraft rises vertically. Control is then obtained as follows: vertically by throttle and collective pitch actuation; laterally by differential pitch variation on the two sides; turning by differential actuation of surfaces 36, and optionally by differential tilt of the shroud assemblies 14; forward and backward by collective tilt and optionally collective inclination of control surfaces 36. In the forward flight regime illustrated in FIGURE 3 control is preferably conventional with rudder, elevator and surfaces 36, acting as ailerons, the propellers and shrouds being secured in the attitude shown.

The aircraft is fitted preferably with landing gear of the usual retractable type, not shown. The aircraft is thus capable of taking off with a short run, with the propellers partially inclined, when a suitable clear ground space is available. This short run take-off is advantageous when it is desired to lift a heavy load since, as is well known, aircraft of this type have a far greater lifting capacity with slight forward motion than they have when rising vertically.

Since the present invention may be embodied in other specific forms, it is desired that the scope of the invention be gauged by the appended claims rather than by the foregoing description and accompanying drawings.

Having illustrated and described my invention, I claim the following:

1. In an aircraft, a fuselage, wings extending laterally from said fuselage in fixed relation thereto, a pivot supported by each of said wings with its axis extending transversely of said fuselage, a structure for supporting shrouded propellers mounted on each pivot to tilt about said axis, said structure comprising two cylindrical shrouds, the axes of said shrouds being spaced apart, one on each side of said pivot axis, a propeller mounted in each of said shrouds, and control means adapted differentially to vary the pitches of said propellers and thus control the thrusts thereof, whereby a difference in magnitude of the thrusts of said propellers produces a moment tending to tilt said supporting structure with respect to said fuselage.

2. In an aircraft, a fuselage, two wings fixed to said fuselage, a pivot at the tip of each wing, said pivots having a common axis transverse of said fuselage, a pair of shrouded propellers mounted on each of said pivots, the axes of said propellers being spaced apart transversely of said pivot axis, and control means adapted differentially to vary the pitches of said propellers and thus control the thrusts thereof, whereby a difference in magnitude of said thrusts produces a moment tending to tilt said propeller pairs about said pivot axis.

3. In an aircraft, a fuselage, two wings fixed to said fuselage, a pivot at the tip of each wing, said pivots having a common axis transverse of said fuselage, a pair of shrouded engine-propeller units mounted on each of said pivots, the axes of said engine-propeller units being spaced apart transversely of said pivot axis, and control means adapted differentially to vary the pitches of the propellers of said engine-propeller units and thus control the thrusts thereof, whereby a difference in magnitude of said thrusts produces a moment tending to tilt said engine-propeller unts about said pivot axis.

4. In an aircraft, a fuselage, two wings fixed to said fuselage, a pivot at the tip of each wing, said pivots having a common axis transverse of said fuselage, a pair of propellers at each wing tip mounted transversely of said pivot axis and adapted to tilt about said axis, and shafting means interconnecting said four propellers, said shafting means comprising a transverse shaft contained within said wings and fuselage, and four shafts connecting the ends of said transverse shaft to the said four propellers in a V-configuration at each end, gears providing the driving connections between said shafts, whereby all four propellers are constrained to rotate in unison.

5. In an aircraft, a fuselage, two wings fixed to said fuselage, four propellers pivoted in pairs at the tips of said wings, and shafting means interconnecting said four propellers, said shafting means comprising a transverse shaft contained within said wings and fuselage, and four branch shafts connecting the ends of said transverse shaft to said four propellers in a V-configuration at each end, said shafts being connected to each other and to said propellers by gearing, whereby all four of said propellers are constrained to rotate in unison.

6. In an aircraft, a fuselage, two wings fixed to said fuselage, four propellers pivoted in pairs at the tips of said wings, shafting means interconnecting said four propellers, said shafting means comprising a transverse shaft and four branch shafts connecting the ends of said transverse shaft to said four propellers in a V-configuration at each end, and an engine connected to said shafting means through an overrunning clutch whereby said propellers are constrained to rotate in unison and whereby they may continue to rotate with the engine stopped.

7. In an aircraft, a fuselage, two wings fixed to said fuselage, a pivot at the tip of each wing, said pivots having a common axis transverse of said fuselage, a pair of shrouded propellers mounted on each of said pivots, the thrust axes of said propellers being spaced apart transversely of said pivot axis, aerodynamic control surfaces mounted in the slipstreams of said propellers, and control means adapted to vary the thrusts of said propellers and the angles of attack of said control surfaces, whereby control of attitude and direction of motion of said aircraft is attained.

8. In a fixed-wing airplane, transverse pivots at the tips of the wings, a tiltable structure mounted on each of said pivots, each of said structures supporting two shrouded propellers having their thrust axes parallel and spaced one on each side of said pivot axis, and control means adapted to vary the pitches of said propellers both collectively and differentially and thus control the thrusts thereof.

9. In a fixed-wing airplane, transverse pivots at the tips of the wings, a tiltable structure mounted on each of said pivots, each of said structures supporting two shrouded engine-propeller units having their thrust axes parallel and spaced one on each side of said pivot axis, and control means adapted to vary the pitches of the propellers of said engine-propeller units both collectively and differentially so as to thus vary the thrusts thereof for controlling the airplane.

10. In a fixed-wing airplane, transverse pivots at the tips of the wings, a tiltable structure mounted on each of said pivots, each of said structures supporting two engine-propeller units having their thrust axes parallel and spaced one on each side of said pivot axis, aerodynamic control surfaces mounted in the slipstreams of said propellers, and control means adapted to vary the thrusts of said engine-propeller units and the angles of attack of said control surfaces both collectively and differentially for controlling the airplane.

11. In a fixed-wing airplane, transverse pivots at the tips of the wings, a structure tiltably mounted on each of said pivots, each of said structures supporting two propellers with their driving engines, the thrust axes of said propellers being parallel and spaced one of each side of said pivot axis, aerodynamic control surfaces mounted in the slipstreams of said propellers, control means adapted to vary the thrusts of said propellers and the angles of attack of said aerodynamic surfaces collectively and differentially for controlling the airplane, and shafting means interconnecting said propellers whereby said propellers are constrained to rotate in unison.

12. In a fixed-wing airplane, transverse coaxial pivots at the tips of the wings, a structure tiltably mounted on each of said pivots, each of said structures supporting two shrouded propellers with their driving engines, the thrust axes of said propellers being parallel and spaced apart one on each side of said pivot axis, aerodynamic control surfaces mounted in the slipstreams of said propellers, control means adapted to vary the thrusts of said propellers and the inclinations of said aerodynamic surfaces collectively and differentially for controlling the airplane, and shafting means interconnecting said propellers whereby said propellers are constrained to rotate in unison, said shafting means comprising a central transverse shaft and V-dispositions of shafts operatively connecting the ends of said central shaft with the propellers.

13. In a fixed-wing airplane, transverse coaxial pivots at the tips of the wings, a structure mounted on each of said pivots, each of said structures supporting two shrouded propellers, the thrust axes of said propellers being parallel and spaced one on each side of said pivot axis, shafting means interconnecting said propellers whereby said propellers are constrained to rotate in unison, said shafting means comprising a central transverse shaft and extension shafts disposed in V-configurations operatively connecting the ends of said central shaft with the propellers, a plurality of engines suitably disposed to drive said shafting means, and overrunning clutches interposed between said engines and said shafting means whereby said propellers may continue to rotate with one or more engines dead.

14. In a fixed-wing airplane, transverse coaxial pivots at the tips of the wings, a structure tiltably mounted on each of said pivots, each of said structures supporting two propellers, the thrusts of said propellers being parallel and spaced one on each side of said pivot axis, shafting means interconnecting said propellers whereby they are constrained to rotate in unison, said shafting means comprising a central transverse shaft and extension shafts disposed in V-configurations operatively connecting the ends of said central shaft with the propellers, a plurality of engines suitably disposed to drive said shafting means, overrunning clutches interposed betwen said engines and said shafting means whereby said propellers may continue to rotate with one or more engines dead, and control means adapted to vary the pitches of said propellers collectively and differentially for control of said airplane.

15. In a fixed-wing airplane, transverse coaxial pivots at the tips of the wings, a structure tiltably mounted on each of said pivots, each of said structures supporting two shrouded propellers, the thrust axes of said propellers being parallel and spaced one on each side of said pivot axis, shafting means interconnecting said propellers whereby said propellers are constrained to rotate in unison, said shafting means comprising a central transverse shaft and extension shafts disposed in V-configurations operationally connecting the ends of said central shaft with the propellers, a plurality of engines suitably disposed to drive said shafting means, overrunning clutches interposed between said shafting means and said engines whereby said propellers may continue to rotate with one or more engines dead, control surfaces mounted in the slipstreams of said propellers, and control means adapted to vary the pitches of said propellers and the inclinations of said control surfaces collectively and differentially for control of the airplane.

16. In an aircraft, a fuselage, two wings fixed to said fuselage, four propellers pivoted in pairs at the tips of said wings, and shafting means interconnecting said four propellers, said shafting means comprising a transverse shaft and four branch shafts connecting the ends of said transverse shaft to said four propellers in an outwardly divergent configuration at each end.

17. In an aircraft, two wings fixed to the fuselage of said aircraft, four propellers pivoted in pairs at the tips of said wings, and shafting means interconnecting said four propellers, said shafting means comprising a transverse shaft and four branch shafts connecting the ends of said transverse shaft to said four propellers in a V-configuration at each end.

18. In an aircraft, two wings fixed to the fuselage of said aircraft, four propellers pivoted in pairs at the tips of said wings, and shafting means interconnecting said four propellers, said shafting means comprising a transverse shaft and four branch shafts connecting said transverse shaft to said four propellers in an outwardly diverging V-configuration at each end.

References Cited by the Examiner

UNITED STATES PATENTS

| | | | |
|---|---|---|---|
| 3,065,929 | 11/1962 | Holland | 244—12 |
| 3,115,317 | 12/1963 | Merrick | 244—12 |
| 3,167,273 | 1/1965 | Calderon | 244—12 |

OTHER REFERENCES

Messerschmitt, German printed app. No. 1,133,633, July 19, 1962.

MILTON BUCHLER, *Primary Examiner.*